US012264235B2

(12) United States Patent
Wang et al.

(10) Patent No.: US 12,264,235 B2
(45) Date of Patent: Apr. 1, 2025

(54) POLYPROPYLENE COMPOSITION FOR FILM SEALING LAYER

(71) Applicant: BOREALIS AG, Vienna (AT)

(72) Inventors: Jingbo Wang, Linz (AT); Klaus Bernreitner, Linz (AT); Markus Gahleitner, Linz (AT); Pauli Leskinen, Porvoo (FI)

(73) Assignee: BOREALIS AG, Vienna (AT)

( * ) Notice: Subject to any disclaimer, the term of this patent is extended or adjusted under 35 U.S.C. 154(b) by 958 days.

(21) Appl. No.: 17/312,758

(22) PCT Filed: Dec. 5, 2019

(86) PCT No.: PCT/EP2019/083769
§ 371 (c)(1),
(2) Date: Jun. 10, 2021

(87) PCT Pub. No.: WO2020/126516
PCT Pub. Date: Jun. 25, 2020

(65) Prior Publication Data
US 2022/0017734 A1 Jan. 20, 2022

(30) Foreign Application Priority Data
Dec. 21, 2018 (EP) .................... 18215213

(51) Int. Cl.
C08L 23/14 (2006.01)
C08J 5/18 (2006.01)

(52) U.S. Cl.
CPC ............ C08L 23/142 (2013.01); C08J 5/18 (2013.01); C08J 2323/16 (2013.01); C08J 2423/14 (2013.01); C08L 2203/162 (2013.01); C08L 2205/025 (2013.01); C08L 2314/02 (2013.01); C08L 2314/06 (2013.01)

(58) Field of Classification Search
CPC ............ C08L 23/142; C08L 2205/025; C08F 210/16; C08F 2500/12; C08F 2500/34; C08F 2500/27; C08F 210/06; C08F 210/14
See application file for complete search history.

(56) References Cited

U.S. PATENT DOCUMENTS

| 9,487,649 | B2 * | 11/2016 | Galvan | C08L 23/142 |
| 11,826,990 | B2 * | 11/2023 | Fu | C08L 73/00 |
| 11,981,801 | B2 * | 5/2024 | Wang | C08L 23/142 |
| 2014/0221584 | A1 * | 8/2014 | Hafner | C07C 41/01 556/11 |
| 2016/0176997 | A1 * | 6/2016 | Resconi | C08F 4/65908 526/348 |
| 2022/0017734 | A1 * | 1/2022 | Wang | C08J 5/18 |
| 2023/0406971 | A1 * | 12/2023 | Wang | C08L 23/142 |

FOREIGN PATENT DOCUMENTS

| EP | 0728796 | A2 | 8/1996 | |
| EP | 0887379 | A1 | 12/1998 | |
| EP | 2610270 | A1 | 12/2011 | |
| EP | 2586824 | A1 * | 5/2013 | ............ C08F 210/06 |
| EP | 2610271 | A1 | 7/2013 | |
| EP | 2610272 | A1 | 7/2013 | |
| EP | 3064514 | A1 | 9/2016 | |
| EP | 3064548 | A1 | 9/2016 | |
| EP | 3119816 | A1 | 1/2017 | |
| NO | 200202576 | A1 | 1/2002 | |
| WO | 9212182 | A1 | 7/1992 | |
| WO | 9924478 | A1 | 5/1999 | |
| WO | 9924479 | A1 | 5/1999 | |
| WO | 0068315 | A1 | 11/2000 | |
| WO | 2003000754 | A1 | 1/2003 | |
| WO | 2003000757 | A1 | 1/2003 | |
| WO | 2004000899 | A1 | 12/2003 | |
| WO | 2004029112 | A1 | 4/2004 | |
| WO | 2004111095 | A1 | 12/2004 | |
| WO | 2007116034 | A1 | 10/2007 | |
| WO | 2007137853 | A1 | 12/2007 | |
| WO | 2010052260 | A1 | 5/2010 | |
| WO | 2010052263 | A1 | 5/2010 | |
| WO | 2010052264 | A1 | 5/2010 | |
| WO | 2011076780 | A1 | 6/2011 | |
| WO | 2011135004 | A2 | 11/2011 | |
| WO | 2012001052 | A2 | 1/2012 | |
| WO | 2012007430 | A1 | 1/2012 | |
| WO | 2012084961 | A1 | 6/2012 | |
| WO | 2013007650 | A1 | 1/2013 | |
| WO | 2015011135 | A1 | 1/2015 | |
| WO | 2015139875 | A1 | 9/2015 | |
| WO | 2015158790 | A2 | 10/2015 | |
| WO | 2016096687 | A1 | 6/2016 | |

(Continued)

OTHER PUBLICATIONS

Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134.

Busico, et al., "Microstructure of Polypropylene," Elsevier, Progress in Polymer Science, 2001, vol. 26, pp. 443-533 American Chemical Society.

Castignolles, et al., "Detection and Quantification of Branching in Polyacrylates by Size-Chromatography (SEC) and Melt-State 13c NMR Specroscopy," Polymer 50, 2009, pp. 2373-2383.

Cheng, H.N., "C NMR Analysis of Ethylene-Propylene Rubbers," Macromolecules, 1984, vol. 17, 1984, pp. 1950-1955.

Filip, et al., "Heteronuclear decoupling under fast MAS by a rotor-synchronized Hahn-echo pulse train," Journal of Magnetic Resonance, vol. 176, 2005, pp. 239-243.

Griffin, et al., "Low-load Rotor-Synchronised Hahn-echo Pulso Train (RS-HEPT) 1H Decoupling in Solid-State NMR: factors affecting MAS Spin-echo Dephasing Times",. Magnetic Resonance in Chemistry, 2007; 45: S198-S208, Published online in Wiley Interscience.

(Continued)

Primary Examiner — Michael M Dollinger
(74) Attorney, Agent, or Firm — Lowenstein Sandler LLP

(57) ABSTRACT

New polypropylene composition which combines low sealing initiation temperature (SIT), low overall migration, good mechanical and optical properties, its use and articles made therefrom.

12 Claims, No Drawings

(56) References Cited

FOREIGN PATENT DOCUMENTS

WO 2017097579 A1 6/2017

OTHER PUBLICATIONS

Kakugo, et al., "C NMR Determination of Monomer Sequence Distribution in Ethylene-Propylene Copolymers Prepared with s-TiCL13-AL (C2H5)2C1," Macromolecules, 1982, vol. 15, pp. 1150-1152.

Klimke, et al., "Optimisation and Application of Polyolefin Branch Quantification by Melt-State 13C NMR Spectroscopy," Macromolecular Chemistry and Physics, vol. 207, 2006, pp. 382-395.

Parkinson, et al., "Effect of Branch Length on 13C NMR Relaxation Properties in Moten Poly[ethylene-co-(x-olefin)] Model Systems," Macromolecular Chemistry and Physics, vol. 208, 2007, pp. 2128-2133.

Pollard, et al., "Observation of Chain Branching in Polyethylene in the Solid State and Melt via 13C NMR Spectroscopy and Melt NMR Relaxation Time Measurements," Macromolecules, vol. 37, 2004, pp. 813-825.

Resconi, et al., "Selectivity in Propene Polymerization with Metallocene Catalysts," Chem. Rev., 2000, vol. 100, pp. 1253-1345.

Singh, et al., "Triad Sequence Determination of Ethylene-Propylene Copolymers—Application of Quantitative 13C NMR," Polymer Testing, 2009, vol. 29, pp. 475-479.

Wang, et al., "Structural Analysis of Ethylene/Propylene Copolymers Synthesized with a Constrained Geometry Catalyst," Macromolecules, 2000, vol. 33, pp. 1157-1162.

Zhou, et al., "A new decoupling method for accurate quantification of polyethylene copolymer composition and triad sequence distribution with 13C NMR," Journal of Magnetic Resonance, vol. 187, 2007, pp. 225-233.

European Search Report for 18215213.2 mailed Jun. 19, 2019, 6 pages.

International Preliminary Report on Patentability for PCT/EP2019/083769 mailed Nov. 30, 2020, 18 pages.

International Search Report for PCT/EP2019/083769 mailed Feb. 2, 2020, 2 pages.

\* cited by examiner

POLYPROPYLENE COMPOSITION FOR FILM SEALING LAYER

The present invention is related to a new polypropylene composition, which combines low sealing initiation temperature (SIT), low overall migration, low C6-solubles, and good mechanical and optical properties, like low haze, a preparation process thereof, and an article comprising said polypropylene composition.

Polypropylenes are suitable for many applications. For instance, polypropylene (PP) is applicable in areas where sealing properties play an important role, like in the food or medical packing industry.

Heat sealing is the predominant method of manufacturing flexible and semi-rigid packages. An important indication of good sealing performance is inter alia a low seal initiation temperature (SIT), which is needed to support high speed on packaging machines. To ensure fast sealing, a low SIT is of advantage. By operating at lower temperature there is the benefit that the article to be sealed is not exposed to high temperature. There are also economic advantages since lower temperatures are of course cheaper to generate and maintain. There are further advantages by avoiding high sealing temperatures, especially when temperature sensitive goods are to be packed.

Furthermore, it is also desired to have a packaging material with satisfying optical properties, such as low haze.

In the field of some food applications such as retort pouches or some medical applications, a sterilization treatment is needed. The most common sterilization procedures are the use of heat (steam), radiation (beta radiation, electrons, or gamma radiation) or chemicals (usually ethylene oxide). Steam sterilization is usually carried out in a temperature range of about 120° C. to 130° C. Thus, the material should have a sufficient thermal stability, like a melting temperature significantly higher than the usual steam sterilization temperature of about 120° C. to 130° C.

Of course, treatment of a polymer under the sterilization conditions outlined above can impair its final properties, especially the optical properties such as transparency, i.e. low haze.

In addition certain regulations have to be fulfilled regarding the use of such materials in food contact applications, thus compliancy to food regulations in terms of overall migration (OM) is a must in advanced packaging applications.

Furthermore, a higher content of soluble resp. extractable components such as hexane solubles is also undesirable in the field of medical packaging.

Irrespectively from the polymer type, a polymer composition must fulfil at best all desired end properties and additionally must be easily processable, i.e. must withstand stress. However, end properties and processing properties act often in a conflicting manner.

It frequently turns out that improvement of one of the desired properties is achieved on the expense of the other properties. For example, in order to improve the sealing behavior, normally low sealing initiation temperature (SIT) is obtained with higher comonomer content, however causing two problems:
1. High comonomer results in lower Tm, which potentially makes steam sterilization worse or even impossible and
2. Incorporation of a higher amount of comonomers, especially for PP based on Ziegler-Natta (ZN) type catalysts, causes problems with C6-solubles (FDA) and overall migration.

EP 3 064 548 suggests a polypropylene composition being a binary blend comprising a propylene-hexene copolymer fraction P1 and a propylene-hexene-ethylene copolymer fraction P2 in specific amounts to achieve the desired balance between high melting point and low sealing initiation temperature SIT, which additionally possess a broad sealing window, beneficial optical properties, low amounts of hexane solubles and sufficient thermal stability to enable sterilization treatment without negatively affecting the optical properties. This composition has a quite high amount of xylene cold soluble (XCS) fraction.

EP 3 064 514 suggests for the same purpose a C2C3 random copolymer composition comprising 3 polymer fractions (A), (B) and (C) with different ethylene-comonomer content. This composition again has a quite high amount of xylene cold soluble (XCS) fraction.

Although a lot of development work has been done in that field, there is still a need for further improvement and thus to design materials having an improved balance between low sealing initiation temperature SIT, beneficial optical properties, low overall migration and sufficient thermal stability to enable sterilization treatment without negatively affecting the optical properties.

The present invention is based on the finding that the above-discussed needs for heat sealing applications can be achieved by a specific design of a polypropylene composition.

SUMMARY OF THE INVENTION

Thus, the present invention is directed to a polypropylene composition (PP) comprising a blend of:
(a) 55.0 to 95.0 wt % of a propylene-ethylene random copolymer (A) having:
(a1) ethylene content in the range of from 1.5 to 6.0 wt %;
(a2) $MFR_2$ (230° C., 2.16 kg, ISO1133) in a range of from 1.5 to 20.0 g/10 min;
(a3) melting temperature Tm (DSC) is in the range of from 135° C. to 155° C.; and
(b) 5.0 to 45.0 wt % of a component (B) selected from a propylene-hexene random copolymer (B1), a propylene-hexene-ethylene terpolymer (B2) or a mixture thereof, having:
(b1) hexene content in the range of from 3.0 to 12.0 wt %;
(b2) optionally an ethylene content of from 0.1 to 2.0 wt %;
(b3) $MFR_2$ (230° C., 2.16 kg, ISO1133) in a range of from 1.5 to 20.0 g/10 min;
(b4) melting temperature Tm (DSC) in the range of from 125° C. to 145° C., based on the total weight of the sum of the component (A) and component (B), whereby the $MFR_2$ (230° C., 2.16 kg, ISO1133) of the blend is in a range of from 1.5 to 20.0 g/10 min.

In a preferred embodiment, the propylene-ethylene random copolymer (A) has a xylene cold soluble (XCS) amount in the range of 3.5 to 10.0 wt %, more preferably from 4.0 to 9.0 wt % as measured according to ISO 16152, first edition, 2005, at 25° C.

In another preferred embodiment, the polypropylene composition (PP) has a melting temperature in the range of from 130° C. to 145° C. as measured by differential scanning calorimetry (DSC) according to ISO 11357.

In another preferred embodiment, the polypropylene composition (PP) has a hexane extractable fraction as determined according to the FDA method (federal registration, title 21, Chapter 1, part 177, section 1520, Annex B) on cast films of 100 µm thickness produced on a monolayer cast film line with a melt temperature of 220° C. and a chill roll temperature of 20° C., the extraction being performed at a temperature of 50° C. and an extraction time of 30 min, of not higher than 3.20 wt %, preferably in the range of 2.0 to 3.20 wt%.

In another preferred embodiment, the weight ratio of component (A) and component (B) is from 1:1 to 12:1, preferably from 2:1 to 7:1.

In another preferred embodiment, the polypropylene composition (PP) has a xylene cold soluble (XCS) amount in the range of from 8.0 to 15.0 wt % (measured according to ISO 16152, first edition, 2005, at 25° C.).

In another aspect, the present invention is directed to a process for the preparation of the polypropylene composition of the present invention, the process comprising the steps of
(i) preparing the propylene-ethylene random copolymer (A) by polymerizing propylene and ethylene in the presence of a Ziegler-Natta catalyst
(ii) preparing the propylene-hexene random copolymer (B1), the propylene-hexene-ethylene terpolymer (B2) or a mixture thereof by polymerizing propylene and hexene and optionally ethylene in the presence of a single site catalyst
(iii) mixing said propylene-ethylene random copolymer (A) with the propylene-hexene random copolymer (B1), the propylene-hexene-ethylene terpolymer (B2) or a mixture thereof to obtain a mixture of (A) and (B) and
(iv) extruding said mixture to obtain the blend of (A) and (B).

In another aspect, the present invention is directed to the use of the polypropylene composition of the present invention for the production of a film.

In another aspect, the present invention is directed to an article comprising an unoriented film, wherein the film has (i) a sealing initiation temperature (SIT, as calculated from DSC) of less than 114° C. and (ii) a relative total penetration energy (Wbreak) as determined by the "Dynatest" method according to ISO 7725-2 at 0° C. on a cast film with a thickness of 50 μm of more than 15.0 J/mm.

In a preferred embodiment of the article, the film has a sealing initiation temperature (SIT, as calculated from DSC) in the range from 105° C. to 113° C.

In another preferred embodiment of the article, the film has a relative total penetration energy (Wbreak) as determined by the "Dynatest" method according to ISO 7725-2 at 0° C. on a cast film with a thickness of 50 μm in the range of 16.0 to 40.0 J/mm.

In another preferred embodiment of the article, the film has a haze determined on 50 μm cast film of below 1.0% and a clarity determined on 50 μm cast film of above 97.0%.

In another preferred embodiment of the article, the article comprises the polypropylene composition (PP) according to the present invention.

In another preferred embodiment of the article, the article comprises an unoriented film comprising more than 90 wt % of the composition (PP) of the present invention, based on the total weight of the article, wherein the film is a cast film or a blown film.

DETAILED DESCRIPTION

In the following the individual components are defined in more detail.

The polypropylene composition of the present inventions comprises a blend of a propylene-ethylene random copolymer (A) and a propylene-hexene random copolymer (B1) or a propylene-hexene-ethylene terpolymer (B2) or a mixture thereof.

The Propylene-Ethylene Random Copolymer (A)

The propylene-ethylene random copolymer (A) has preferably an ethylene content in the range of from 1.5 to 6.0 wt %, yet more preferably in the range of from 2.0 to 5.5 wt % and even more preferably in the range of from 2.5 to 5.0 wt %.

It is optional that the propylene-ethylene random copolymer (A) is additionally vis-broken. This kind of modification can be used to finally adjust the melt flow rate of the propylene-ethylene random copolymer (A) to the level as ideally desired in the present invention. The degradation of a polypropylene to form a product having a lower molecular weight and a higher melt flow rate (MFR) is generally referred to as a viscosity-breaking or vis-breaking process. The skilled person will be familiar with such a process as it is described for instance in WO 2016/096687 A1 or EP 0 728 796 A1 and the like. Known degradation processes proceed either thermally, in particular at temperatures above 280° C., or in the presence of free-radical generators. In process technology, the free-radical induced process is carried out in extruders or injection-moulding machines at temperatures above 180° C. Free-radical generators used are organic peroxides, which are added during the processing step in diluted form (PP Mastermix, diluted in oil, stabilized on inorganic supports) or directly as a liquid. Under the given processing conditions, the peroxide disintegrates into free radicals, which initiate the chain cleavage reactions and form polymers having the desired rheological properties (melt viscosities).

The ideal $MFR_2$ (230° C., 2.16 kg, ISO1133) of the propylene-ethylene random copolymer (A), including the optional vis-breaking step, is in the range of from 1.5 to 20.0 g/10 min, preferably in the range of from 3.0 to 15.0 g/10 min, more preferably in the range of from 4.0 to 12.0 g/10 min, yet more preferably in the range of from 5.0 to 10.0 g/10 min and even more preferably in the range of from 6.0 to 9.0 g/10 min. Accordingly, if there is an optional vis-breaking step, these numbers apply to the final product after the optional vis-breaking step. Preferably, the vis-breaking step is included to achieve this ideal $MFR_2$ values (230° C., 2.16 kg, ISO1133) as defined above especially in case the propylene-ethylene random copolymer (A) has $MFR_2$ values (230° C., 2.16 kg, ISO1133) that are substantially lower than those values required for the present invention as defined above. Before or without vis-breaking, the propylene-ethylene random copolymer (A) can have $MFR_2$ (230° C., 2.16 kg, ISO 1133), which can be substantially lower than the ideal values as defined above. For instance, without or before vis-breaking, the propylene-ethylene random copolymer (A) can have $MFR_2$ values (230° C., 2.16 kg, ISO1133) in the range of 0.5 to 5.0 g/10 min, more preferably 0.8 to 4.0 g/10 min, or even more preferably 1.0 to 3.0 g/10 min.

The melting temperature Tm of the propylene-ethylene random copolymer (A) is in the range of from 135° C. to 155° C., preferably in the range of from 138° C. to 150° C., and more preferably in the range of from 138 to 145° C.

In order to be suitable for food or pharmaceutical packaging applications it is furthermore desirable that the propylene-ethylene random copolymer has a limited amount of soluble and/or extractable substances.

It is therefore further preferred that the content of xylene cold solubles (XCS) of the propylene-ethylene random copolymer (A) is preferably from 3.5 to 10.0 wt %, more preferably from 4.0 to 9.0 wt %, and even more preferably from 4.5 to 8.5 wt%.

The propylene-ethylene random copolymer (A) can be produced in a single polymerization step comprising a single polymerization reactor (R1) or in a sequential polymerization process comprising at least two polymerization reactors (R1) and (R2), whereby in the first polymerization reactor (R1) a first propylene copolymer fraction (R-PP1) is produced, which is subsequently transferred into the second polymerization reactor (R2). In the second polymerization reactor (R2) a second propylene copolymer fraction (R-PP2) is then produced in the presence of the first propylene copolymer fraction (R-PP1).

Polymerization processes which are suitable for producing the propylene-ethylene random copolymer generally comprises one or two polymerization stages and each stage can be carried out in solution, slurry, fluidized bed, bulk or gas phase.

The term "polymerization reactor" shall indicate that the main polymerization takes place. Thus in case the process consists of one or two polymerization reactors, this definition does not exclude the option that the overall system comprises for instance a pre-polymerization step in a pre-polymerization reactor. The term "consist of" is only a closing formulation in view of the main polymerization reactors.

The term "sequential polymerization process" indicates that the propylene-ethylene random copolymer is produced in at least two reactors connected in series. Accordingly, such a polymerization system comprises at least a first polymerization reactor (R1) and a second polymerization reactor (R2), and optionally a third polymerization reactor (R3).

The first, respectively the single, polymerization reactor (R1) is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention the slurry reactor is preferably a (bulk) loop reactor.

In case a "sequential polymerization process" is applied the second polymerization reactor (R2) and the optional third polymerization reactor (R3) are gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

A preferred multistage process is a "loop-gas phase"-process, such as developed by Borealis (known as BORSTAR® technology) described e.g. in patent literature, such as in EP 0 887 379, WO 92/12182, WO 2004/000899, WO 2004/111095, WO 99/24478, WO 99/24479 or in WO 00/68315.

A further suitable slurry-gas phase process is the Spheripol® process of Basell.

The propylene-ethylene random copolymer (A) can be unimodal or multimodal, like bimodal, in view of comonomer content and/or $MFR_2$.

If the propylene-ethylene random copolymer (A) is unimodal, it is preferably produced in a single polymerization step in one polymerization reactor (R1). Alternatively, a unimodal propylene-ethylene random copolymer can be produced in a sequential polymerization process using the same polymerization conditions in all reactors.

If the propylene-ethylene random copolymer is multimodal, it is preferably produced in a sequential polymerization process using different polymerization conditions (amount of comonomer, hydrogen amount, etc.) in the reactors.

Preferably, the propylene-ethylene random copolymer (A) according to this invention has been produced in the presence of a Ziegler-Natta catalyst. The catalyst influences in particular the microstructure of the polymer. In particular, polypropylenes prepared by using a metallocene catalyst provide a different microstructure compared to polypropylenes prepared by using Ziegler-Natta (ZN) catalysts. The most significant difference is the presence of regio-defects in metallocene-made polypropylenes, which is not the case for polypropylenes made by Ziegler-Natta (ZN). The regio-defects can be of three different types, namely 2,1-erythro (2,1e), 2,1-threo (2,1t) and 3,1 defects. A detailed description of the structure and mechanism of formation of regio-defects in polypropylene can be found in Chemical Reviews 2000, 100(4), pages 1316-1327. The term "2,1 regio defects" as used in the present invention defines the sum of 2,1 erythro regio-defects and 2,1 threo regio-defects.

Accordingly, it is preferred that the propylene-ethylene random copolymer (A) according to this invention has 2,1 regio-defects, like 2,1 erythro regio-defects, of at most 0.4%, more preferably of at most 0.3%, still more preferably of at most 0.2%, determined by $^{13}C$-NMR spectroscopy. In one specific embodiment no 2,1 regio-defects, like 2,1 erythro regio-defects, are detectable for the propylene copolymer (R-PP).

The Ziegler-Natta catalyst is fed into the first, respectively the single, polymerization reactor (R1) and is optionally transferred with the polymer (slurry) obtained in the first polymerization reactor (R1) into the subsequent reactors, if the propylene-ethylene random copolymer is produced in a sequential polymerization process.

If the process covers also a pre-polymerization step it is preferred that all of the Ziegler-Natta catalyst is fed in the pre-polymerization reactor. Subsequently the pre-polymerization product containing the Ziegler-Natta catalyst is transferred into the first, respectively the single, polymerization reactor (R1).

This Ziegler-Natta catalyst can be any stereo-specific Ziegler-Natta catalyst for propylene polymerization, which preferably is capable of catalysing the polymerization and copolymerization of propylene and comonomers at a pressure of 500 to 10000 kPa, in particular 2500 to 8000 kPa, and at a temperature of 40 to 110° C., in particular of 60 to 110° C.

Preferably, the Ziegler-Natta catalyst (ZN—C) comprises a high-yield Ziegler-Natta type catalyst including an internal donor component, which can be used at high polymerization temperatures of 80° C. or more.

Such high-yield Ziegler-Natta catalyst (ZN—C) can comprise a succinate, a diether, a phthalate etc., or mixtures therefrom as internal donor (ID) and are for example commercially available for example from LyondellBasell under the Avant ZN trade name.

Further useful solid catalysts are also those disclosed in WO-A-2003/000757, WO-A-2003/000754, WO-A-2004/029112 and WO 2007/137853. These catalysts are solid catalysts of spherical particles with compact structure and low surface area of the particles. Further, these catalysts are featured by a uniform distribution of catalytically active sites thorough the catalyst particles. Catalysts are prepared by emulsion-solidification method, where no external support is needed. The dispersed phase in the form of liquid droplets of the emulsion forms the catalyst part, which is transformed to solid catalyst particles during the solidification step.

Thus, in an embodiment of the present invention, the solid catalyst component is prepared by a process comprising:
- preparing a solution of magnesium complex by reacting an alkoxy magnesium compound and an electron donor or a precursor thereof in a $C_6$-$C_{10}$ aromatic liquid reaction medium;
- reacting said magnesium complex with a four valent titanium compound, preferably $TiCl_4$, at a temperature greater than 10° C. and less than 50° C. to produce an emulsion of a denser, dispersed phase having Ti/Mg mol ratio 0.1 to 10 and in a continuous phase having Ti/Mg mol ratio 10 to 100; and
- agitating the emulsion, optionally in the presence of an emulsion stabilizer and/or a turbulence minimizing agent, in order to maintain the droplets of said dispersed phase within an average size range of 5 to 200 µm.

The catalyst particles are obtained after solidifying said droplets of the dispersed phase by heating, preferably at a temperature from 80° C. to 110° C. In said process an aluminium alkyl compound of the formula $AlR_{3-n}X_n$, where R is an alkyl and/or an alkoxy group of 1 to 20, preferably of 1 to 10 carbon atoms, X is a halogen and n is 0, 1 or 2, is added and brought into contact with the droplets of the dispersed phase of the agitated emulsion. Alternatively, the aluminium alkyl compound of the formula $AlR_{3-n}X_n$, is brought into contact with the solidified particles at the washing step before recovering the final solid particles.

Suitable internal electron donors are, among others, (di) esters of aliphatic or cycloaliphatic (di)carboxylic acids. Said aliphatic or cycloaliphatic carboxylic acid ester or diester can be formed in situ by reaction of an aliphatic or cycloaliphatic carboxylic acid chloride or diacid chloride with a C2-C16 alkanol and/or diol, and is preferable di-2-ethyl-hexyl citraconate.

A further suitable catalyst for the present invention is a solid Ziegler-Natta catalyst, which comprises compounds of a transition metal of Group 4 to 6 of IUPAC, like titanium, a Group 2 metal compound, like a magnesium, and an internal donor being a non-phthalic compound, more preferably a non-phthalic acid ester, still more preferably being a diester of non-phthalic dicarboxylic acids as described in more detail below. Thus, the catalyst is fully free of undesired phthalic compounds. Further, the solid catalyst is free of any external support material, like silica or $MgCl_2$, but the catalyst is self-supported.

This Ziegler-Natta catalyst) can be further defined by the way as obtained.

Accordingly, the Ziegler-Natta catalyst is preferably obtained by a process comprising the steps of
a)
- a1) providing a solution of at least a Group 2 metal alkoxy compound (Ax) being the reaction product of a Group 2 metal compound and a monohydric alcohol (A) comprising in addition to the hydroxyl moiety at least one ether moiety optionally in an organic liquid reaction medium; or
- a2) a solution of at least a Group 2 metal alkoxy compound (Ax') being the reaction product of a Group 2 metal compound and an alcohol mixture of the monohydric alcohol (A) and a monohydric alcohol (B) of formula ROH, optionally in an organic liquid reaction medium; or
- a3) providing a solution of a mixture of the Group 2 alkoxy compound (Ax) and a Group 2 metal alkoxy compound (Bx) being the reaction product of a Group 2 metal compound and the monohydric alcohol (B), optionally in an organic liquid reaction medium; or
- a4) providing a solution of Group 2 alkoxide of formula $M(OR^1)_n(OR^2)_mX_{2-n-m}$ or mixture of Group 2 alkoxides $M(OR^1)_nX_{2-n'}$ and $M(OR^2)_mX_{2-m'}$, where M is Group 2 metal, X is halogen, $R^1$ and $R^2$ are different alkyl groups with $C_2$ to $C_{1-6}$ carbon atoms, and $0<n<2$, $0<m<2$ and $n+m+(2-n-m)=2$, provided that both n and m≠0, $0<n'<2$ and $0<m'<2$; and
b) adding said solution from step a) to at least one compound of a transition metal of Group 4 to 6 and
c) obtaining the solid catalyst component particles, and adding a non-phthalic internal donor, at any step prior to step c).

The internal donor or precursor thereof is added preferably to the solution of step a).

According to the procedure above the Ziegler-Natta catalyst can be obtained via precipitation method or via emulsion (liquid/liquid two-phase system)—solidification method depending on the physical conditions, especially temperature used in steps b) and c).

In both methods (precipitation or emulsion-solidification) the catalyst chemistry is the same.

In precipitation method combination of the solution of step a) with at least one transition metal compound in step b) is carried out and the whole reaction mixture is kept at least at 50° C., more preferably in the temperature range of 55° C. to 110° C., more preferably in the range of 70° C. to 100° C., to secure full precipitation of the catalyst component in form of a solid particles (step c).

In emulsion—solidification method in step b) the solution of step a) is typically added to the at least one transition metal compound at a lower temperature, such as from −10° C. to below 50° C., preferably from −5° C. to 30° C. During agitation of the emulsion the temperature is typically kept at −10 to below 40° C., preferably from −5° C. to 30° C. Droplets of the dispersed phase of the emulsion form the active catalyst composition. Solidification (step c) of the droplets is suitably carried out by heating the emulsion to a temperature of 70° C. to 150° C., preferably to 80° C. to 110° C.

The catalyst prepared by emulsion—solidification method is preferably used in the present invention.

In a preferred embodiment in step a) the solution of a2) or a3) are used, i.e. a solution of (Ax') or a solution of a mixture of (Ax) and (Bx).

Preferably, the Group 2 metal is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms.

Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2- ethylhexyloxy)ethanol and 1,3-propylene-glycol-monobutyl ether, 3-butoxy-2-propanol being particularly preferred.

Illustrative monohydric alcohols (B) are of formula ROH, with R being a straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably, the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R"(OH)m to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition, a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred.

The Mg compound is typically provided as a 10 to 50 wt % solution in a solvent as indicated above. Typical commercially available Mg compound, especially dialkyl magnesium solutions are 20-40 wt % solutions in toluene or heptanes.

The reaction for the preparation of the magnesium alkoxy compound may be carried out at a temperature of 40° C. to 70° C. Most suitable temperature is selected depending on the Mg compound and alcohol(s) used.

The transition metal compound of Group 4 to 6 is preferably a titanium compound, most preferably a titanium halide, like $TiCl_4$.

The non-phthalic internal donor that can be used in the preparation of the catalyst is preferably selected from (di) esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from alpha-olefin polymers of alpha-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion—solidification method may be washed at least once, preferably at least twice, most preferably at least three times with an aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 $g/m^2$, more preferably below 10 $g/m^2$. Typically, the amount of Ti is 1 to 6 wt %, Mg 10 to 20 wt % and donor 10 to 40 wt % of the catalyst composition.

Detailed description of preparation of catalysts is disclosed in WO 2012/007430, EP2610271, EP 261027 and EP2610272.

The Ziegler-Natta catalyst is optionally modified by the so-called BNT-technology during a pre-polymerization step in order to introduce a polymeric nucleating agent.

Such a polymeric nucleating agent is preferably a vinyl polymer, such as a vinyl polymer derived from monomers of the formula

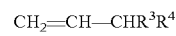

wherein $R^3$ and $R^4$, together with the carbon atom they are attached to, form an optionally substituted saturated or unsaturated or aromatic ring or a fused ring system, wherein the ring or fused ring moiety contains 4 to 20 carbon atoms, preferably 5 to 12 membered saturated or unsaturated or aromatic ring or a fused ring system or independently represent a linear or branched $C_4$-$C_{30}$ alkane, $C_4$-$C_{20}$ cycloalkane or $C_4$-$C_{20}$ aromatic ring. Preferably $R^3$ and $R^4$, together with the C-atom wherein they are attached to, form a five- or six-membered saturated or unsaturated or aromatic ring or independently represent a lower alkyl group comprising from 1 to 4 carbon atoms. Preferred vinyl compounds for the preparation of a polymeric nucleating agent to be used in accordance with the present invention are in particular vinyl cycloalkanes, in particular vinyl cyclohexane (VCH), vinyl cyclopentane, and vinyl-2-methyl cyclohexane, 3-methyl-1-butene, 3-ethyl-1-hexene, 3-methyl-1-pentene, 4-methyl-1-pentene or mixtures thereof. VCH is a particularly preferred monomer.

The weight ratio of vinyl compound to polymerization catalyst in the modification step of the polymerization catalyst preferably is 0.3 or more up to 40.0, such as 0.4 to 20.0 or more preferably 0.5 to 15.0, like 0.5 to 2.0.

The polymerization of the vinyl compound, e.g. VCH, can be done in any inert fluid that does not dissolve the polymer formed (e.g. polyVCH). It is important to make sure that the viscosity of the final catalyst/polymerized vinyl compound/inert fluid mixture is sufficiently high to prevent the catalyst particles from settling during storage and transport.

The adjustment of the viscosity of the mixture can be done either before or after the polymerization of the vinyl compound. It is, e.g., possible to carry out the polymerization in a low viscosity oil and after the polymerization of the vinyl compound the viscosity can be adjusted by addition of a highly viscous substance. Such highly viscous substance can be a "wax", such as an oil or a mixture of an oil with a solid or highly viscous substance (oil-grease). The viscosity of such a viscous substance is usually 1,000 to 15,000 cP at room temperature. The advantage of using wax is that the catalyst storing and feeding into the process is improved. Since no washing, drying, sieving and transferring are needed, the catalyst activity is maintained.

The weight ratio between the oil and the solid or highly viscous polymer is preferably less than 5:1.

In addition to viscous substances, liquid hydrocarbons, such as isobutane, propane, pentane and hexane, can also be used as a medium in the modification step.

The polypropylenes produced with a catalyst modified with polymerized vinyl compounds contain essentially no free (unreacted) vinyl compounds. This means that the vinyl compounds shall be completely reacted in the catalyst modification step. To that end, the weight ratio of the (added) vinyl compound to the catalyst should be in the range of 0.05 to 10.0, preferably less than 3.0, more preferably about 0.1 to 2.0, and in particular about 0.1 to 1.5. It should be noted that no benefits are achieved by using vinyl compounds in excess.

Further, the reaction time of the catalyst modification by polymerization of a vinyl compound should be sufficient to allow for complete reaction of the vinyl monomer, i.e. the polymerization is continued until the amount of unreacted vinyl compounds in the reaction mixture (including the polymerization medium and the reactants) is less than 0.5 wt %, in particular less than 2000 ppm by weight (shown by analysis). Thus, when the pre-polymerized catalyst contains a maximum of about 0.1 wt % vinyl compound, the final vinyl compound content in the polypropylene will be below the limit of determination using the GC-MS method (<0.01 ppm by weight). Generally, when operating on an industrial scale, a polymerization time of at least 30 minutes is required, preferably the polymerization time is at least 1 hour and in particular at least 5 hours. Polymerization times even in the range of 6 to 50 hours can be used. The modification can be done at temperatures of 10° C. to 60° C., preferably 15° C. to 55° C.

General conditions for the modification of the catalyst are also disclosed in WO 00/6831, incorporated herein by reference with respect to the modification of the polymerization catalyst.

The preferred embodiments as described previously in the present application with respect to the vinyl compound also apply with respect to the polymerization catalyst of the present invention and the preferred polypropylene composition in accordance with the present invention.

Suitable media for the modification step include, in addition to oils, also aliphatic inert organic solvents with low viscosity, such as pentane and heptane. Furthermore, small amounts of hydrogen can be used during the modification.

The Ziegler-Natta catalyst is preferably used in association with an alkyl aluminum cocatalyst and optionally external donors.

As further component in the instant polymerization process an external donor is preferably present. Suitable external donors include certain silanes, ethers, esters, amines, ketones, heterocyclic compounds and blends of these. It is especially preferred to use a silane. It is most preferred to use silanes of the general formula $$Ra_pRb_gSi(ORc)_{(4-p-q)}$$

wherein Ra, Rb and Re denote a hydrocarbon radical, in particular an alkyl or cycloalkyl group, and wherein p and q are numbers ranging from 0 to 3 with their sum p+q being equal to or less than 3. Ra, Rb and Re can be chosen independently from one another and can be the same or different. Specific examples of such silanes are (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$, or of general formula $$Si(OCH_2CH_3)_3(NR^5R^6)$$

wherein $R^5$ and $R^6$ can be the same or different a represent a hydrocarbon group having 1 to 12 carbon atoms.

$R^5$ and $R^6$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^5$ and $R^6$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably, both $R^5$ and $R^6$ are the same, yet more preferably both $R^5$ and $R^6$ are an ethyl group.

Especially preferred external donors are the dicyclopentyl dimethoxy silane donor (D-donor) or the cyclohexylmethyl dimethoxy silane donor (C-Donor).

In addition to the Ziegler-Natta catalyst and the optional external donor, a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst is a trialkylaluminium, like triethylaluminium (TEAL), dialkyl aluminium chloride or alkyl aluminium dichloride or mixtures thereof. In one specific embodiment the co-catalyst is triethylaluminium (TEAL).

Preferably, the ratio between the co-catalyst (Co) and the external donor (ED) [Co/ED] and/or the ratio between the co-catalyst (Co) and the transition metal (TM) [Co/TM] should be carefully chosen.

Accordingly, (a) the mol-ratio of co-catalyst (Co) to external donor (ED) [Co/ED] must be in the range of 5 to 45, preferably is in the range of 5 to 35, more preferably is in the range of 5 to 25; and optionally (b) the mol-ratio of co-catalyst (Co) to titanium compound (TC) [Co/TC] must be in the range of above 80 to 500, preferably is in the range of 100 to 350, still more preferably is in the range of 120 to 300.

The propylene-ethylene random copolymer used according to this invention is thus preferably produced in the presence of (a) a Ziegler-Natta catalyst comprising an internal donor,
(b) optionally a co-catalyst (Co), and
(c) optionally an external donor (ED).

The propylene-ethylene random copolymer (A) as defined in the instant invention may contain up to 5.0 wt % additives, like α-nucleating agents and antioxidants, as well as slip agents and antiblocking agents. Preferably, the additive content (without α-nucleating agents) is below 3.0 wt %, like below 1.0 wt %.

The Propylene-Hexene Random Copolymer (B1) and the Propylene-Hexene-Ethylene Terpolymer (B2) or a Mixture Thereof The component (B) is selected from a) a propylene-hexene random copolymer (B1) formed by the polymerization of propylene and hexene as the only comonomer, b) a propylene ethylene hexene terpolymer (B2) preferably formed from the polymerization of propylene with ethylene and hexene as the only comonomers, or c) a mixture of (B1) and (B2). In one preferred embodiment, component (B) is a blend of a propylene-hexene random copolymer (B1) and a propylene ethylene hexene terpolymer (B2) or prepared in a sequential multistage polymerization process. Accordingly, component (B) can generally be unimodal or multimodal, preferably bimodal.

It is optional that the propylene-hexene random copolymer (B1) or the propylene ethylene hexene terpolymer (B2) is additionally vis-broken. This kind of modification can be used to adjust the melt flow rate of the propylene-hexene random copolymer (B1) or the propylene ethylene hexene terpolymer (B2) or a mixture thereof to the ideal level as desired in the present invention. The degradation of a polypropylene to form a product having a lower molecular weight and a higher melt flow rate (MFR) is generally referred to as a viscosity-breaking or vis-breaking process. The skilled person will be familiar with such a process as it is described for instance in WO 2016/096687 A1 or EP 0 728 796 A1 and the like. Known degradation processes proceed either thermally, in particular at temperatures above 280° C., or in the presence of free-radical generators. In process technology, the free-radical induced process is carried out in extruders or injection-moulding machines at temperatures above 180° C. Free-radical generators used are organic peroxides, which are added during the processing step in diluted form (PP Mastermix, diluted in oil, stabilized on inorganic supports) or directly as a liquid. Under the given processing conditions, the peroxide disintegrates into free radicals, which initiate the chain cleavage reactions and form polymers having the desired rheological properties (melt viscosities).

In another preferred embodiment, the propylene-hexene random copolymer (B1) or the propylene ethylene hexene terpolymer (B2) is monophasic. In other words, the propylene-hexene random copolymer (B1) or the propylene ethylene hexene terpolymer (B2) is not a heterophasic propylene copolymer.

The propylene-hexene random copolymer (B1) or the propylene ethylene hexene terpolymer (B2), or a mixture thereof, has an hexene content in the range of from 3.0 to 12.0 wt %, preferably in the range of from 3.5 to 10.0 wt %, more preferably in the range of from 4.0 to 8.0 wt %, yet more preferably in the range of from 4.5 to 6.0 wt %, and most preferably in the range of from 4.7 to 5.5 wt %.

If component (B) is the propylene ethylene hexene terpolymer (B2) or a mixture of (B2) with the propylene-hexene random copolymer (B1), the ethylene content is preferably in the range from 0.1 to 2.0 wt %, preferably from 0.2 to 1.9 wt %, more preferably from 0.25 to 1.8 wt %, even more preferably from 0.3 to 1.7 wt %, based on the total weight of the propylene ethylene hexene terpolymer (B2) or the mixture of (B2) with the propylene-hexene random copolymer (B1).

The ideal $MFR_2$ (230° C., 2.16 kg, ISO 1133) of the propylene-hexene random copolymer (B1), the propylene ethylene hexene terpolymer (B2), or a mixture thereof, optionally after an additional vis-breaking step, is in the range of from 1.5 to 20.0 g/10 min, preferably in the range of from 3.0 to 15.0 g/10 min, more preferably in the range of from 4.5 to 12.5 g/10 min, yet more preferably in the range of from 5.0 to 10.0 g/10 min and even more preferably in the range of from 6.0 to 9.0 g/10 min. Accordingly, these numbers apply to the ideal product including the optional vis-breaking step. This means that a vis-breaking step is preferably included to achieve the above $MFR_2$ values (230° C., 2.16 kg, ISO1133) in case that the propylene-hexene random copolymer (B1), the propylene ethylene hexene terpolymer (B2), or a mixture thereof, would have $MFR_2$ values (230° C., 2.16 kg, ISO1133) that are substantially lower than the those ideal values as defined above. Without or before vis-breaking, the propylene-hexene random copolymer (B1), the propylene ethylene hexene terpolymer (B2), or a mixture thereof, may have values lower than the above ideal ones. For instance, the $MFR_2$ (230° C., 2.16 kg, ISO1133) of the propylene-hexene random copolymer (B1), the propylene ethylene hexene terpolymer (B2), or a mixture thereof, before or without an additional vis-breaking step, can be in the range of from 0.5 to 5.0 g/10 min, preferably in the range of from 0.8 to 4.0 g/10 min, or more preferably in the range of from 1.0 to 3.0 g/10 min.

The melting temperature Tm of the propylene-hexene random copolymer (B1), the propylene ethylene hexene terpolymer (B2) or a mixture thereof is in the range of from 125° C. to 145° C., preferably in the range of from 130° C. to 142° C., and most preferably from 132° C. to 140° C., as measured by differential scanning calorimetry (DSC) according to ISO 11357.

The crystallization temperature Tc of the propylene-hexene random copolymer (B1) or the propylene ethylene hexene terpolymer (B2) or a mixture thereof is preferably in the range of from 85° C. to 120° C., more preferably in the range of from 90° C. to 115° C., and most preferably from 94° C. to 107° C., as measured by differential scanning calorimetry (DSC) according to ISO 11357.

It is further preferred that the content of xylene cold solubles (XCS) of the propylene-hexene random copolymer (B1) or the propylene ethylene hexene terpolymer (B2) or a mixture thereof is preferably from 10.0 to 25.0 wt %, more preferably from 12.0 to 22.0 wt %, and even more preferably from 13.0 to 20.0 wt%.

The propylene-hexene random copolymer (B1), the propylene-hexene-ethylene terpolymer (B2) or a mixture thereof as described above are obtainable, preferably obtained, in the presence of a single site catalyst, preferably a metallocene catalyst.

The metallocene catalyst can be a supported catalyst, using conventional supports or can be free from an external carrier. By free from an external carrier is meant that the catalyst does not contain an external support, such as an inorganic support, for example, silica or alumina, or an organic polymeric support material Preferably used are metallocene catalysts, which are free from an external carrier.

Preferably, the metallocene catalyst comprises (i) a complex of formula (I):

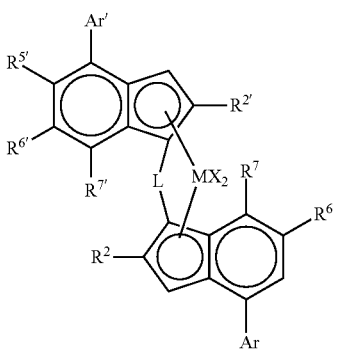

wherein

M is zirconium or hafnium;

each X is a sigma-donor ligand;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_2$O-aryl, $C_7$-$C_2$O-arylalkyl or $C_7$-$C_2$O-alkylaryl;

$R^2$ and $R^{2'}$ are each independently a $C_1$-$C_{20}$ hydrocarbyl radical optionally containing one or more heteroatoms from groups 14-16;

$R^{5'}$ is a $C_{1-20}$ hydrocarbyl group containing one or more heteroatoms from groups 14-16 optionally substituted by one or more halo atoms;

$R^6$ and $R^{6'}$ are each independently hydrogen or a $C_{1-20}$ hydrocarbyl group optionally containing one or more heteroatoms from groups 14-16;

$R^7$ and $R^{7'}$ are each independently hydrogen or $C_{1-20}$ hydrocarbyl group optionally containing one or more heteroatoms from groups 14-16;

Ar is independently an aryl or heteroaryl group having up to 20 carbon atoms optionally substituted by one or more groups $R^1$;

Ar' is independently an aryl or heteroaryl group having up to 20 carbon atoms optionally substituted by one or more groups $R^1$;

each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$;

each $R^4$ is a $C_{1-20}$ hydrocarbyl group; and (ii) a cocatalyst comprising a compound of a group 13 metal, e.g. Al or boron compound.

The catalyst preferably used to produce the propylene-hexene random copolymer (B1), the propylene-hexene-ethylene terpolymer (B2) or a mixture thereof used in the invention is in solid particulate form. As mentioned above it can be supported on a conventional carrier know to an art skilled person. Preferably, the used catalyst is free from an external carrier.

Ideally, the catalyst is obtainable by a process in which (a) a liquid/liquid emulsion system is formed, said liquid/liquid emulsion system comprising a solution of the catalyst components (i) and (ii) dispersed in a solvent so as to form dispersed droplets; and (b) solid particles are formed by solidifying said dispersed droplets.

The term $C_{1-20}$ hydrocarbyl group includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups or of course mixtures of these groups such as cycloalkyl substituted by alkyl.

Unless otherwise stated, preferred $C_{1-20}$ hydrocarbyl groups are $C_{1-20}$ alkyl, $C_{4-20}$ cycloalkyl, $C_{5-20}$ cycloalkyl-alkyl groups, $C_{7-20}$ alkylaryl groups, $C_{7-20}$ arylalkyl groups or $C_{6-20}$ aryl groups, especially $C_{1-10}$ alkyl groups, $C_6$-10 aryl groups, or $C_{7-12}$ arylalkyl groups, e.g. $C_{1-8}$ alkyl groups. Most especially preferred hydrocarbyl groups are methyl, ethyl, propyl, isopropyl, tertbutyl, isobutyl, $C_{5-6}$-cycloalkyl, cyclohexylmethyl, phenyl or benzyl.

The term halo includes fluoro, chloro, bromo and iodo groups, especially chloro groups, when relating to the complex definition.

The oxidation state of the metal ion is governed primarily by the nature of the metal ion in question and the stability of the individual oxidation states of each metal ion.

It will be appreciated that in the complexes of the invention, the metal ion M is coordinated by ligands X so as to satisfy the valency of the metal ion and to fill its available coordination sites. The nature of these σ-ligands can vary greatly.

Such catalysts are described for example in WO 2013/007650.

Preferred complexes for the preparation of the propylene-hexene random copolymer (B1), the propylene-hexene-ethylene terpolymer (B2) or a mixture thereof are of formula (II') or (II)

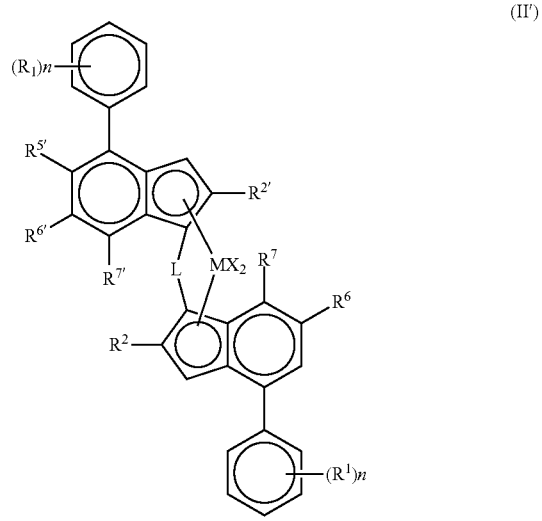

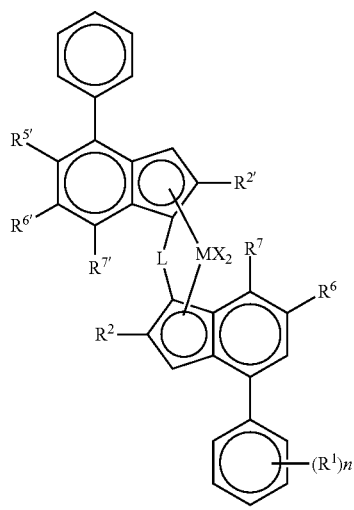
(II)

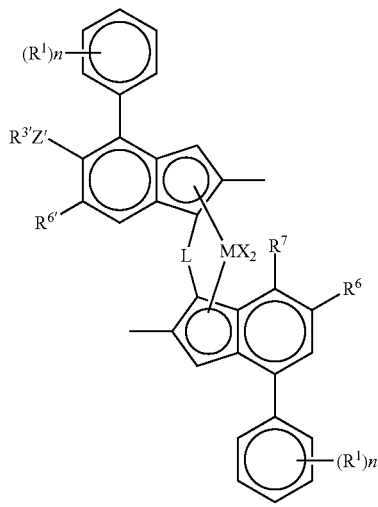
(III')

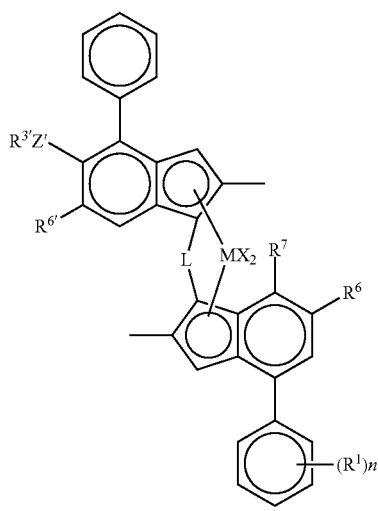
(III)

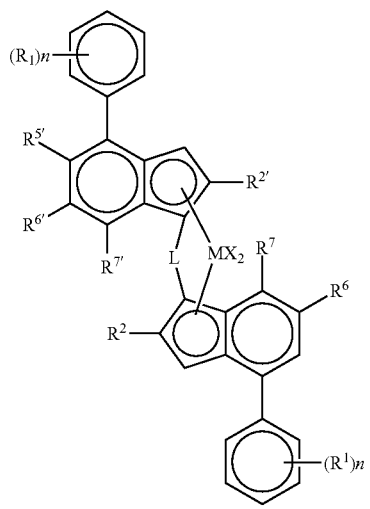
(IIIb)

wherein

M is zirconium or hafnium;

each X is a sigma-donor ligand, preferably each X is independently a hydrogen atom, a halogen atom, $C_{1-6}$ alkoxy group, $C_{1-6}$ alkyl, phenyl or benzyl group; L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_{1-20}$ alkyl, $C_{3-10}$ cycloalkyl, tri($C_{1-20}$-alkyl)silyl, $C_{6-20}$-aryl, $C_{7-20}$ arylalkyl or $C_{7-20}$ alkylaryl;

each $R^2$ or $R^{2'}$ is a $C_{1-10}$ alkyl group;

$R^{5'}$ is a $C_{1-10}$ alkyl group or $Z'R^{3'}$ group;

$R^6$ is hydrogen or a $C_{1-10}$ alkyl group;

$R^{6'}$ is a $C_{1-10}$ alkyl group or $C_{6-10}$ aryl group;

$R^7$ is hydrogen, a $C_{1-6}$ alkyl group or $ZR^3$ group;

$R^{7'}$ is hydrogen or a $C_{1-10}$ alkyl group;

Z and Z' are independently O or S;

$R^{3'}$ is a $C_{1-10}$ alkyl group, or a $C_{6-10}$ aryl group optionally substituted by one or more halo groups;

$R^3$ is a $C_{1-10}$ alkyl group;

each n is independently 0 to 4, e.g. 0, 1 or 2;

and each $R^1$ is independently a $C_{1-20}$ hydrocarbyl group, e.g. $C_{1-10}$ alkyl group.

Further preferred complexes for the preparation of the propylene-hexene random copolymer (B1) the propylene-hexene-ethylene terpolymer (B2) or a mixture thereof are of formula (III') or (III) or (IIIb):

M is zirconium or hafnium;

each X is a sigma ligand, preferably each X is independently a hydrogen atom, a halogen atom, $C_{1-6}$ alkoxy group, $C_{1-6}$ alkyl, phenyl or benzyl group;

L is a divalent bridge selected from —R'$_2$C— or —R'$_2$Si— wherein each R' is independently a hydrogen atom, C$_{1-20}$ alkyl or C$_{3-10}$ cycloalkyl;

R$^{5'}$ is a C$_{1-6}$ alkyl group

R$^6$ is hydrogen or a C$_{1-10}$ alkyl group;

R$^{6'}$ is a C$_{1-10}$ alkyl group or C$_{6-10}$ aryl group;

R$^7$ is hydrogen, C$_{1-6}$ alkyl or OC$_{1-6}$ alkyl;

Z' is O or S;

R$^3$ is a C$_{1-10}$ alkyl group, or C$_{6-10}$ aryl group optionally substituted by one or more halo groups;

n is independently 0 to 4, e.g. 0, 1 or 2; and each R$^1$ is independently a C$_{1-10}$ alkyl group.

Further preferred complexes for the preparation of the propylene-hexene random copolymer (B1), the propylene-hexene-ethylene terpolymer (B2) or a mixture thereof are of formula (IV') or (IV) or (IVb):

(IV')

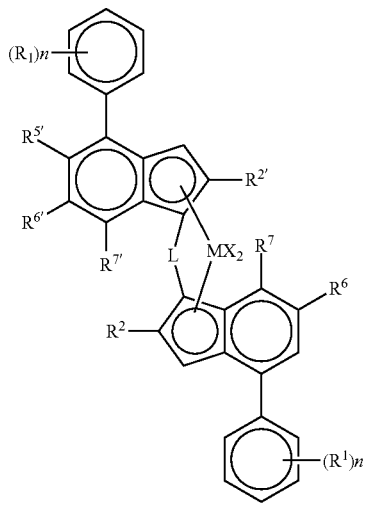

(IVb)

(IV)

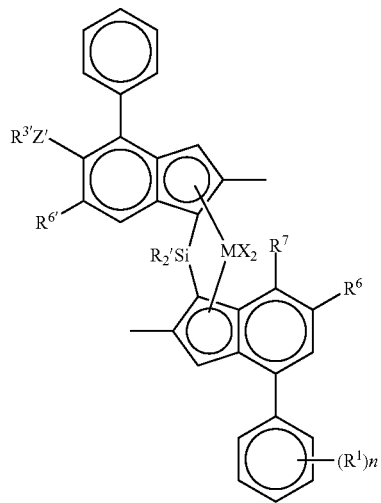

M is zirconium or hafnium;

each X is a sigma ligand, preferably each X is independently a hydrogen atom, a halogen atom, C$_{1-6}$-alkoxy group, C$_{1-6}$-alkyl, phenyl or benzyl group;

each R' is independently a hydrogen atom, C$_{1-20}$ alkyl or C$_{3-7}$ cycloalkyl;

R$^{5'}$ is a C$_{1-4}$ alkyl group

R$^6$ is hydrogen or a C$_{1-10}$ alkyl group;

R$^{6'}$ is a C$_{1-10}$ alkyl group or C$_{6-10}$ aryl group;

R$^7$ is hydrogen, C$_{1-6}$ alkyl or OC$_{1-6}$ alkyl;

Z' is O or S;

R$^3$ is a C$_{1-10}$ alkyl group, or C$_{6-10}$ aryl group optionally substituted by one or more halo groups;

n is independently 0, 1 to 2; and each R$^1$ is independently a C$_{1-8}$ alkyl group.

Most especially, the complex for the preparation of the propylene-hexene random copolymer (B1), the propylene-hexene-ethylene terpolymer (B2) or a mixture thereof is of formula (V') or (V) or (Vb):

(V')

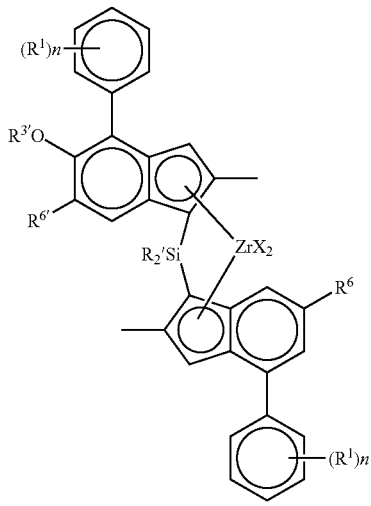

-continued

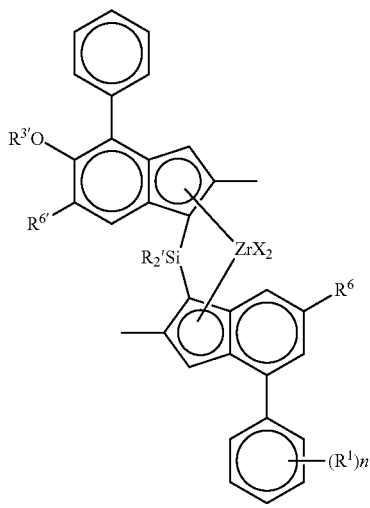
(V)

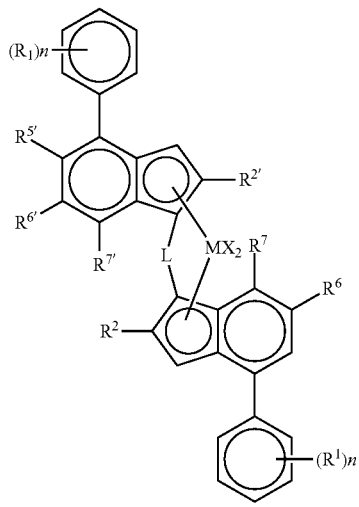
(IVb)

wherein each X is a sigma ligand, preferably each X is independently a hydrogen atom, a halogen atom, $C_{1-6}$-alkoxy group, $C_{1-6}$-alkyl, phenyl or benzyl group;

R' is independently a $C_{1-6}$ alkyl or $C_{3-10}$ cycloalkyl;

$R^1$ is independently $C_{1-8}$ alkyl;

$R^{5'}$ is a $C_{1-4}$ alkyl group $R^6$ is hydrogen or a $C_{1-8}$ alkyl group;

$R^{6'}$ is a $C_{1-8}$ alkyl group or $C_{6-10}$ aryl group;

$R^{3'}$ is a $C_{1-6}$ alkyl group, or $C_{6-10}$ aryl group optionally substituted by one or more halo groups; and n is independently 0, 1 or 2.

The synthesis of these materials is described for example in WO2013/007650.

The ligands required to form the complexes and hence catalysts of the invention can be synthesised by any process and the skilled organic chemist would be able to devise various synthetic protocols for the manufacture of the necessary ligand materials. For Example WO 2007/116034 discloses the necessary chemistry. Synthetic protocols can also generally be found in WO 2002/02576, WO 2011/135004, WO 2012/084961, WO 2012/001052, WO 2011/076780 and WO 2015/158790. The examples section also provides the skilled person with sufficient direction.

For example, the following general synthetic scheme can be used:

Scheme 1

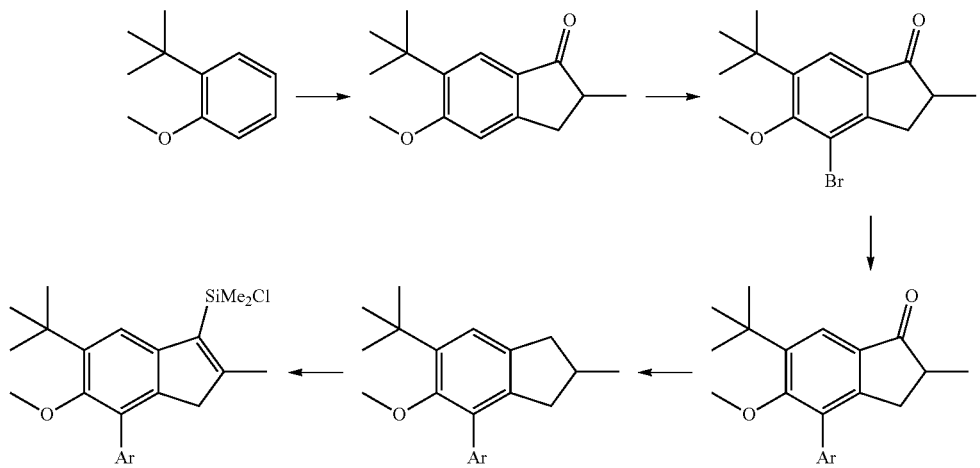

Suitable reagents for this transformation are given in the examples section.

Whilst this scheme refers to specific compounds, the general principles displayed here apply to all of the metallocenes described above. If the ligands are asymmetric, a conventional reaction with $SiMe_2Cl_2$ cannot be effected to bridge two ligands as that leads to symmetrical products. Instead, each ligand has to be attached to the bridge stepwise with control over the reaction stoichiometry.

Cocatalyst

To form an active catalytic species it is normally necessary to employ a cocatalyst as is well known in the art. Cocatalysts comprising one or more compounds of Group 13 metals, like organoaluminium compounds or borates used to activate metallocene catalysts are suitable for use in this invention. Thus, the cocatalyst is preferably an alumoxane, like MAO. Borate cocatalysts can also be employed. The use of $B(C_6F_5)_3$, $C_6H_5N(CH_3)_2H:B(C_6F_5)_4$, $(C_6H_5)_3C:B(C_6F_5)_4$ or $Ni(CN)_4[B(C_6F_5)_3]_4{}^{2-}$ is especially preferred. Suitable cocatalysts are described in WO2013/007650.

Suitable amounts of cocatalyst will be well known to the skilled man.

Manufacture

The catalyst used to manufacture the heterophasic copolymers of the invention is ideally provided in solid particulate form but unsupported, i.e. no external carrier is used. In order to provide the catalyst of the invention in solid form but without using an external carrier, it is preferred if a liquid liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape and particle size and without using any added external porous support material, such as an inorganic oxide, e.g. silica. Also desirable surface properties can be obtained. WO2013/007650 again contains comprehensive details of this process.

Catalyst Prepolymerization

The use of the heterogeneous, non-supported catalysts, (i.e. "self-supported" catalysts) might have, as a drawback, a tendency to dissolve to some extent in the polymerization media, i.e. some active catalyst components might leach out of the catalyst particles during slurry polymerization, whereby the original good morphology of the catalyst might be lost. These leached catalyst components are very active possibly causing problems during polymerization. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerization, which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to "prepolymerize" the catalyst before using it in polymerization process. It has to be noted that prepolymerization in this regard is part of the catalyst preparation process, being a step carried out after a solid catalyst is formed. This catalyst prepolymerization step is not part of the actual polymerization configuration, which might comprise a conventional process pre-polymerization step as well. After the catalyst prepolymerization step, a solid catalyst is obtained and used in polymerization.

Catalyst "prepolymerization" takes place following the solidification step of the liquid-liquid emulsion process hereinbefore described. Prepolymerization may take place by known methods described in the art, such as that described in WO 2010/052263, WO 2010/052260 or WO 2010/052264. Preferable embodiments of this aspect of the invention are described herein.

As monomers in the catalyst prepolymerization step preferably alpha-olefins are used. Preferable $C_2$-$C_{10}$ olefins, such as ethylene, propylene, 1-butene, 1-pentene, 1-hexene, 4-methyl-1-pentene, 1-heptene, 1-octene, 1-nonene 1-decene, styrene and vinylcyclohexene are used. Most preferred alpha-olefins are ethylene and propylene.

The catalyst prepolymerization may be carried out in gas phase or in an inert diluent, typically oil or fluorinated hydrocarbon, preferably in fluorinated hydrocarbons or mixture of fluorinated hydrocarbons. Preferably, perfluorinated hydrocarbons are used. The melting point of such (per) fluorinated hydrocarbons is typically in the range of 0° C. to 140° C., preferably 30° C. to 120° C., like 50° C. to 110° C.

Where the catalyst prepolymerization is done in fluorinated hydrocarbons, the temperature for the prepolymerization step is below 70° C., e.g. in the range of from −30° C. to 70° C., preferably from 0° C. to 65° C. and more preferably in the range of from 20° C. to 55° C.

Pressure within the prepolymerization vessel is preferably higher than atmospheric pressure to minimize the eventual leaching of air and/or moisture into the catalyst vessel. Preferably, the pressure is in the range of at least 1 to 15 bar, preferably 2 to 10 bar. The prepolymerization vessel is preferably kept in an inert atmosphere, such as under nitrogen or argon or similar atmosphere.

Prepolymerization is continued until the prepolymerization degree defined as weight of polymer matrix/weight of solid catalyst before prepolymerization step is reached. The degree is below 25, preferably 0.5 to 10.0, more preferably 1.0 to 8.0, most preferably 2.0 to 6.0.

Use of the catalyst prepolymerization step offers the advantage of minimizing leaching of catalyst components and thus local overheating.

After prepolymerization, the catalyst can be isolated and stored.

The propylene-hexene random copolymer (B1) or the propylene-hexene-ethylene terpolymer (B2), and a mixture thereof can be produced in a single polymerization step comprising a single polymerization reactor (R1) or in a sequential polymerization process comprising at least two polymerization reactors (R1) and (R2), whereby in the first polymerization reactor (R1) a first propylene copolymer fraction (R-PP1) is produced, which is subsequently transferred into the second polymerization reactor (R2). In the second polymerization reactor (R2) a second propylene copolymer fraction (R-PP2) is produced in the presence of the first propylene copolymer fraction (R-PP1).

Polymerization processes which are suitable for producing the propylene-hexene random copolymer (B1) or the propylene-hexene-ethylene terpolymer (B2) or a mixture thereof generally comprises at one or two polymerization stages and each stage can be carried out in solution, slurry, fluidized bed, bulk or gas phase.

The term "polymerization reactor" is defined as described above for Component (A)

The term "sequential polymerization process" is defined as described above for Component (A).

The first, respectively the single, polymerization reactor (R1) is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention, the slurry reactor is preferably a (bulk) loop reactor.

In case a "sequential polymerization process" is applied the second polymerization reactor (R2) and the optional third polymerization reactor (R3) are gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

A preferred multistage process is a "loop-gas phase"-process, such as developed by *Borealis* (known as BORSTAR® technology) described e.g. in patent literature, such as in EP 0 887 379, WO 92/12182, WO 2004/000899, WO 2004/111095, WO 99/24478, WO 99/24479 or in WO 00/68315.

A further suitable slurry-gas phase process is the Spheripol® process of Basell.

The propylene-hexene random copolymer (B1), the propylene-hexene-ethylene terpolymer, (B2) or a mixture thereof can be unimodal or multimodal, like bimodal, in view of comonomer content and/or $MFR_2$.

If the propylene-hexene random copolymer (B1) or the propylene-hexene-ethylene terpolymer (B2) is unimodal, it is preferably produced in a single polymerization step in one polymerization reactor (R1). Alternatively, a unimodal propylene-hexene random copolymer (B1) or a unimodal propylene-hexene-ethylene terpolymer (B2) can be produced in a sequential polymerization process using the same polymerization conditions in all reactors.

If the propylene-hexene random copolymer (B1) or the propylene-hexene-ethylene terpolymer (B2) is multimodal, or is a mixture of (B1) with (B2), it is preferably produced in a sequential polymerization process using different polymerization conditions (amount of comonomer, hydrogen amount, etc.) in the reactors.

Preferably the propylene-hexene random copolymer (B1) or the propylene-hexene-ethylene terpolymer (B2) when used according to the present invention is unimodal.

The propylene-hexene random copolymer (B1) or the propylene-hexene-ethylene terpolymer (B2) as defined in the instant invention may contain up to 5.0 wt % additives, like α-nucleating agents and antioxidants, as well as slip agents and antiblocking agents. Preferably, the additive content (without α-nucleating agents) is below 3.0 wt %, like below 1.0 wt %.

The Polypropylene Composition (PP)

The polypropylene composition (PP) according to this invention can be obtained by (melt)-mixing the individual fractions, i.e. the propylene-ethylene random copolymer (A) with the propylene-hexene random copolymer (B1) the propylene-hexene-ethylene terpolymer (B2) or a mixture thereof. During the melt mixing suitable additives can additionally be added. For mixing, a conventional compounding or blending apparatus, e.g. a Banbury mixer, a 2-roll rubber mill, Buss-co-kneader, a single screw extruder with special mixing segments or a twin screw extruder may be used. The polymer composition recovered from the extruder is usually in the form of pellets.

In the blend for the polypropylene composition (PP) according to this invention component (A) is present in an amount of from 55.0 to 95.0 wt % and component (B) is present in an amount of from 5.0 to 45.0 wt %, based on the total weight of the sum of the component (A) and component (B).

Preferably component (A) is present in an amount of from 55.0 to 95.0 wt %, more preferably in an amount of from 57.0 to 90.0 wt %, and most preferably in an amount of 60.0 to 75.0 wt %, based on the total weight of the sum of the component (A) and component (B). Thus, component (B) is preferably present in an amount of from 5.0 to 45.0 wt %, more preferably in an amount of from 10.0 to 43.0 wt %, and most preferably in an amount of 25.0 to 40.0 wt %, based on the total weight of the sum of the component (A) and component (B).

Alternatively or additionally, the weight ratio of component (A) and component (B) is from 1:1 to 12:1, preferably from 1.5 to 10:1, even more preferably from 2:1 to 7:1, and most preferably from 3:1 to 5:1.

For preparing the composition it is essential that a component (B) is used, which has a melting temperature Tm lower than the melting temperature Tm of component (A) The overall melt flow rate, i.e. the melt flow rate $MFR_2$ (230° C.) measured according to ISO 1133 of polypropylene composition (PP) is in a range of from 1.5 to 20.0 g/10 min, preferably in a range of from 3.0 g/10 min to 15.0 g/10 min, more preferably in a range of from 4.5 g/10 min to 12.5 g/10 min and even more preferably in a range of from 6.0 to 11.0 g/10 min.

In a preferred embodiment, the melting temperature of the propylene-hexene random copolymer (B1), the propylene-hexene-ethylene terpolymer (B2) or a mixture thereof is lower than the melting temperature of the propylene-ethylene random copolymer (A).

It is appreciated that the inventive polypropylene composition (PP) has a melting temperature in the range of from 130° C. to 145° C., preferably in the range of from 132° C. to 142° C., and more preferably in the range of from 133° C. to 139° C. as measured by differential scanning calorimetry (DSC) according to ISO 11357.

Additionally it is appreciated that the inventive polypropylene composition (PP) has a crystallization temperature in the range of from 85° C. to 115° C., preferably in the range of from 90° C. to 110° C. and more preferably in the range of from 95° C. to 105° C. as measured by differential scanning calorimetry (DSC) according to ISO 11357.

The xylene cold soluble (XCS) fraction of the instant polypropylene composition (PP) is preferably from 8.0 to 15.0 wt %, more preferably from 9.0 to 14.0 wt %, and even more preferably from 10.0 to 13.0 wt %.

In another preferred embodiment, the polypropylene composition (PP) is monophasic. In other words, the polypropylene composition (PP) is not a heterophasic propylene copolymer composition.

The polypropylene composition (PP) preferably has a hexane extractable fraction as determined according to the FDA method (federal registration, title 21, Chapter 1, part 177, section 1520, Annex B) on cast films of 100 μm thickness produced on a monolayer cast film line with a melt temperature of 220° C. and a chill roll temperature of 20° C., the extraction being performed at a temperature of 50° C.

and an extraction time of 30 min, of not higher than 3.20 wt %, preferably in the range of 2.0 to 3.20 wt %, more preferably in the range of 2.2 to 3.10 wt %, and even more preferably from 2.4 to 3.06 wt %.

The polypropylene composition (PP) as defined in the instant invention may contain up to 5.0 wt % additives, like α-nucleating agents and antioxidants, as well as slip agents and antiblocking agents. Preferably the additive content (without α-nucleating agents) is below 3.0 wt %, like below 1.0 wt %.

The present invention is further directed to a process for the preparation of the polypropylene composition (PP) as defined above, the process comprising the steps of
(i) preparing component (A) by polymerizing propylene and ethylene in the presence of a Ziegler-Natta catalyst
(ii) preparing component (B) by polymerizing propylene and hexene and optionally ethylene in the presence of a metallocene catalyst
(iii) mixing said propylene-ethylene random copolymer (A) with the propylene-hexene random copolymer (B1), the propylene-hexene-ethylene terpolymer (B2) or a mixture thereof to obtain a mixture of (A) and (B) and
(iv) extruding said mixture to obtain the blend of (A) and (B).

Applications

The present invention is not only directed to the instant polypropylene composition (PP) but also the use of the polypropylene composition (PP) for preparing articles and the articles comprising the polypropylene composition (PP). Accordingly, in a preferred embodiment of the article, the article comprises the polypropylene composition according to the present invention.

In another preferred embodiment of the article, the article comprises an unoriented film comprising more than 90 wt % of the article of the present invention, more preferably more than 95 wt % of the article of the present invention, or even more preferably more than 97 wt % of the article of the present invention, based on the total weight of the article, wherein the film is preferably a cast film or a blown film.

The article preferably comprises an unoriented film, wherein the film has (i) a sealing initiation temperature (SIT, as calculated from DSC) of less than 114° C. and/or (ii) a relative total penetration energy (Wbreak) as determined by the "Dynatest" method according to ISO 7725-2 at 0° C. on a cast film with a thickness of 50 μm of more than 15.0 J/mm.

In another preferred embodiment, the article comprises an unoriented film having a relative total penetration energy (Wbreak) as determined by the "Dynatest" method according to ISO 7725-2 at 0° C. on a cast film with a thickness of 50 μm in the range of 16.0 to 40.0 J/mm, more preferably in the range of 17.0 to 38 J/mm, or even more preferably in the range of 18.0 to 35.0 J/mm.

Suitable articles are films for flexible packaging systems, such as bags or pouches for food and pharmaceutical packaging or medical articles in general.

In one embodiment, the present invention is related also to unoriented films and film layers of multi-layer film constructions comprising the inventive polypropylene composition (PP). Accordingly the present invention is also directed to unoriented films, like cast films or blown films, e.g. air cooled blown films, comprising at least 90 wt %, preferably comprising at least 95 wt %, yet more preferably comprising at least 99 wt %, of the instant polypropylene composition (PP).

It has been found that such polypropylene composition according to the present invention provides the film material made thereof with a combination of low sealing initiation temperature (SIT), beneficial optical and mechanical properties, low amounts of hexane solubles and sufficient thermal stability to enable sterilization treatment, by which the optical properties are kept on a high level before and after sterilization.

Thus, films, respectively articles according to the present invention preferably comprising the above-defined polypropylene composition (PP) are suitable for being sterilized without negatively affecting the optical properties.

Therefore, the present invention is also directed to a sterilizable or sterilized article, preferably to a sterilizable or sterilized film, like a sterilizable or sterilized film. More preferably the invention is directed to containers, i.e. pouches, especially to steam sterilizable or steam sterilized containers, i.e. pouches, preferably comprising, more preferably consisting of, the film as defined herein. The container is in particular a pouch. Further said container, i.e. pouch, has been preferably subjected to a steam sterilization treatment in a temperature range of about 120° C. to 130° C.

Further, the invention is also directed to a multi-layer film construction, comprising an unoriented film as defined above as an outermost layer.

For being able to serve as a sealing layer in a multi-layer film construction, such an unoriented film preferably comprising the inventive polypropylene composition shall preferably have a sealing initiation temperature (SIT) of below 114° C., like in the range of from 105° C. to 113° C., more preferably in the range of from 107° C. to 112° C., like in the range of from 108° C. to less than 111° C. Accordingly, in a preferred embodiment of the article, the film has a sealing initiation temperature (SIT, as calculated from DSC) in the range from 105° C. to 113° C., more preferably in the range of from 107° C. to 112° C., like in the range of from 108° C. to less than 111° C.

Clarity determined on 50 μm cast film preferably comprising the inventive polypropylene composition (PP) shall preferably be above 97.0%, more preferably above 97.5%, and even more preferably above 98.0%.

In another preferred embodiment of the article, the unoriented films according to the invention furthermore have a haze value (determined on 50 μm cast film) of below 1.0%, preferably of below 0.8% and more preferably of below 0.5% and a clarity (determined 50 μm cast film) of above 97.0%, preferably above 97.5%, and most preferably above 98.0%.

In another preferred embodiment of the article, the unoriented film preferably has a relative total penetration energy (Wbreak) as determined by the "Dynatest" method according to ISO 7725-2 at 0° C. on a cast film with a thickness of 50 μm of more than 15.0 J/mm, more preferably in the range of 16.0 to 40.0 J/mm, preferably 17.0 to 38.0 J/mm, or even more preferably 18.0 to 35.0 J/mm.

A multi-layer film construction preferably comprising at least one layer comprising the inventive polypropylene composition (PP) is preferably produced by multi-layer co-extrusion followed by film casting or film blowing. In this case, at least one of the outermost layers of said multi-layer film construction serving as sealing layer(s) shall comprise the inventive polypropylene composition (PP) as defined above. The inventive multilayer film construction shall preferably have a thickness in the range of 30 to 500 μm, more preferably in the range of 50 to 400 μm, like in the range of 60 to 300 μm. The sealing layer(s) comprising the inventive polypropylene composition (PP) shall preferably have a thickness in the range of 3 to 70 μm, more preferably in the range of 5 to 60 μm, like in the range of 10 to 50 μm.

Films and/or multi-layer film constructions according to the present invention shall preferably be used for flexible packaging systems, such as bags or pouches for food and pharmaceutical packaging or medical articles in general.

In case a film is produced by cast film technology the molten polypropylene composition (PP) is extruded through a slot extrusion die onto a chill roll to cool the polypropylene composition (PP) to a solid film. Typically, the polypropylene composition (PP) is firstly compressed and liquefied in an extruder, it being possible for any additives to be already added to the polypropylene composition (PP) or introduced at this stage via a masterbatch. The melt is then forced through a flat-film die (slot die), and the extruded film is taken off on one or more take-off rolls, during which it cools and solidifies. It has proven particularly favorable to keep the take-off roll or rolls, by means of which the extruded film is cooled and solidified, at a temperature from 10° C. to 50° C., preferably from 15° C. to 40° C.

In the blown film process, the polypropylene composition melt is extruded through an annular die and blown into a tubular film by forming a bubble, which is collapsed between nip rollers after solidification. The blown extrusion can be preferably effected at a temperature in the range 160° C. to 240° C., and cooled by water or preferably by blowing gas (generally air) at a temperature of 10° C. to 50° C. to provide a frost line height of 0.5 to 8 times the diameter of the die. The blow up ratio should generally be in the range of from 1.5 to 4, such as from 2 to 4, preferably 2.5 to 3.5.

Methods

The xylene soluble fraction at room temperature (XCS, wt %): The amount of the polymer soluble in xylene is determined at 25° C. according to standard method ISO 16152; 2005, 5th edition;
MFR$_2$ (230° C.) is measured according to ISO 1133 (230° C., 2.16 kg load)

The melt flow rate is measured as the MFR$_2$ in accordance with ISO 1133 15 (230° C., 2.16 kg load) for polypropylene. The MFR is an indication of the flowability, and hence the processability, of the polymer. The higher the melt flow rate, the lower the viscosity of the polymer.

Quantification of Microstructure by NMR Spectroscopy

Quantitative nuclear-magnetic resonance (NMR) spectroscopy was used to quantify the isotacticity, regio-regularity and comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. Standard single-pulse excitation was employed utilising the NOE at short recycle delays (as described in Pollard, M., Klimke, K., Graf, R., Spiess, H. W., Wilhelm, M., Sperber, O., Piel, C., Kaminsky, W., Macromolecules 2004, 37, 813, and in Klimke, K., Parkinson, M., Piel, C., Kaminsky, W., Spiess, H. W., Wilhelm, M., Macromol. Chem. Phys. 2006, 207, 382) and the RS-HEPT decoupling scheme (as described in Filip, X., Tripon, C., Filip, C., J. Mag. Resn. 2005, 176, 239, and in Griffin, J. M., Tripon, C., Samoson, A., Filip, C., and Brown, S. P., Mag. Res. in Chem. 2007, 45, S1, S198). A total of 1024 (1k) transients were acquired per spectra.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm.

The tacticity distribution was quantified through integration of the methyl region in the $^{13}C\{^1H\}$ spectra, correcting for any signal not related to the primary (1,2) inserted propene stereo sequences, as described in Busico, V., Cipullo, R., Prog. Polym. Sci. 2001, 26, 443 and in Busico, V., Cipullo, R., Monaco, G., Vacatello, M., Segre, A. L., Macromolecules 1997, 30, 6251.

Characteristic signals corresponding to regio defects were observed (Resconi, L., Cavallo, L., Fait, A., Piemontesi, F., Chem. Rev. 2000, 100, 1253). The influence of regio defects on the quantification of the tacticity distribution was corrected for by subtraction of representative regio defect integrals from specific integrals of the stereo sequences. The isotacticity was determined at the triad level and reported as the percentage of isotactic triad mm with respect to all triad sequences:

% mm=(mm/(mm+mr+rr))*100

Comonomer Determination by NMR Spectroscopy (C2 Determination)

Quantitative nuclear-magnetic resonance (NMR) spectroscopy was further used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra. Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^{1}H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[mol\ \%]=100*fE$$

The weight percent comonomer incorporation was calculated from the mole fraction:

$$E[wt\ \%]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Comonomer Determination: Hexene Content—$^{13}C$ NMR Spectroscopy

Quantitative $^{13}C\{^{1}H\}$ NMR spectra recorded in the molten-state using a Bruker Avance III 500 NMR spectrometer operating at 500.13 and 125.76 MHz for $^{1}H$ and $^{13}C$ respectively. All spectra were recorded using a $^{13}C$ optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. (Klimke, K., Parkinson, M., Piel, C., Kaminsky, W., Spiess, H. W., Wilhelm, M., Macromol. Chem. Phys. 2006; 207:382., Parkinson, M., Klimke, K., Spiess, H. W., Wilhelm, M., Macromol. Chem. Phys. 2007; 208:2128., Castignolles, P., Graf, R., Parkinson, M., Wilhelm, M., Gaborieau, M., Polymer 50 (2009) 2373). Standard single-pulse excitation was employed utilising the NOE at short recycle delays of 3s (Klimke, K., Parkinson, M., Piel, C., Kaminsky, W., Spiess, H. W., Wilhelm, M., Macromol. Chem. Phys. 2006; 207: 382., Pollard, M., Klimke, K., Graf, R., Spiess, H. W., Wilhelm, M., Sperber, O., Piel, C., Kaminsky, W., Macromolecules 2004; 37:813.). and the RS-HEPT decoupling scheme (Filip, X., Tripon, C., Filip, C., J. Mag. Resn. 2005, 176, 239., Griffin, J. M., Tripon, C., Samoson, A., Filip, C., and Brown, S. P., Mag. Res. in Chem. 2007 45, S1, S198). A total of 16384 (16k) transients were acquired per spectra.

Quantitative $^{13}C\{^{1}H\}$ NMR spectra were processed, integrated and relevant quantitative properties determined from the integrals. All chemical shifts are internally referenced to the methyl isotactic pentad (mmmm) at 21.85 ppm.

Characteristic signals corresponding to the incorporation of 1-hexene were observed and the comonomer content quantified in the following way.

The amount of 1-hexene incorporated in PHP isolated sequences was quantified using the integral of the αB4 sites at 44.2 ppm accounting for the number of reporting sites per comonomer:

$$H=I\alpha B4/2$$

The amount of 1-hexene incorporated in PHHP double consecutive sequences was quantified using the integral of the ααB4 site at 41.7 ppm accounting for the number of reporting sites per comonomer:

$$HH=2*I\alpha\alpha B4$$

When double consecutive incorporation was observed the amount of 1-hexene incorporated in PHP isolated sequences needed to be compensated due to the overlap of the signals αB4 and αB4B4 at 44.4 ppm:

$$H=(I\alpha B4-2*I\alpha\alpha B4)/2$$

The total 1-hexene content was calculated based on the sum of isolated and consecutively incorporated 1-hexene:

$$Htotal=H+HH$$

When no sites indicative of consecutive incorporation observed the total 1-hexen comonomer content was calculated solely on this quantity:

$$Htotal=H$$

Characteristic signals indicative of regio 2,1-erythro defects were observed (Resconi, L., Cavallo, L., Fait, A., Piemontesi, F., Chem. Rev. 2000, 100, 1253).

The presence of 2,1-erythro regio defects was indicated by the presence of the Pαβ (21e8) and Pαγ (21e6) methyl sites at 17.7 and 17.2 ppm and confirmed by other characteristic signals.

The total amount of secondary (2,1-erythro) inserted propene was quantified based on the αα21e9 methylene site at 42.4 ppm:

$$P21=I\alpha\alpha 21e9$$

The total amount of primary (1,2) inserted propene was quantified based on the main Sαα methylene sites at 46.7 ppm and compensating for the relative amount of 2,1-erythro, αB4 and ααB4B4 methylene unit of propene not accounted for (note H and HH count number of hexene monomers per sequence not the number of sequences):

$$P12=I_S\alpha\alpha+2*P21+H+HH/2$$

The total amount of propene was quantified as the sum of primary (1,2) and secondary (2,1-erythro) inserted propene:

$$Ptotal=P12+P21=I_S\alpha\alpha+3*I\alpha\alpha 21e9+(I\alpha B4-2*I\alpha\alpha B4)/2+I\alpha\alpha B4$$

This simplifies to:

$$Ptotal=I_S\alpha\alpha+3*I\alpha\alpha 21e9+0.5*I\alpha B4$$

The total mole fraction of 1-hexene in the polymer was then calculated as:

$$fH=Htotal/(Htotal+Ptotal)$$

The full integral equation for the mole fraction of 1-hexene in the polymer was:

$$fH=(((I\alpha B4-2*I\alpha\alpha B4)/2)+(2*I\alpha\alpha B4)/((I_S\alpha\alpha+3*I\alpha\alpha 21e9+0.5*I\alpha B4)+((I\alpha B4-2*I\alpha\alpha B4)/2)+(2*I\alpha\alpha B4))$$

This simplifies to:

$$fH=(I\alpha B4/2+I\alpha\alpha B4)/(I_S\alpha\alpha+3*I\alpha\alpha 21e9+I\alpha B4+I\alpha\alpha B4)$$

The total comonomer incorporation of 1-hexene in mole percent was calculated from the mole fraction in the usual manner:

$$H[mol\ \%]=100*fH$$

The total comonomer incorporation of 1-hexene in weight percent was calculated from the mole fraction in the standard manner:

$$H[wt\ \%]=100*(fH*84.16)/((fH*84.16)+((1-fH)*42.08))$$

DSC analysis, melting temperature (Tm) and crystallization temperature (Tc): measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30° C. to +225° C.

Crystallization temperature and heat of crystallization (He) are determined from the cooling step, while melting temperature and heat of fusion (Hf) are determined from the second heating step.

Haze and clarity were determined according to ASTM D1003-00 on cast films of 50 μm thickness produced on a monolayer cast film line with a melt temperature of 220° C. and a chill roll temperature of 20° C.

Sealing initiation temperature (SIT); sealing end temperature (SET), sealing range: Differential Scanning Calorimetry (DSC) experiments were run on a TA Instruments Q2000 device calibrated with Indium, Zinc, and Tin according to ISO 11357/1. The measurements were run under nitrogen atmosphere (50 mL min-1) on 5±0.5 mg samples in a heat/cool/heat cycle with a scan rate of 10° C./min between −30° C. and 225° C. according to ISO 11357/3. Melting (Tm) and crystallisation (Tc) temperatures were taken as the peaks of the endotherms and exotherms in the cooling cycle and the second heating cycle respectively. The Sealing Initiation Temperature (SIT) was predicted by analyzing the second heating scan according to the following procedure: the first limit for integration was set at 16° C., the second limit at Tm+20° C., and the total melting enthalpy was registered. The temperature T1 is defined as the temperature at which 19% of this melting enthalpy with the abovementioned limits for integration was obtained. The parameter SIT is finally calculated as:

$$SIT=1.0596 \times T1+3.8501$$

The hexane extractable fraction is determined according to FDA method (federal registration, title 21, Chapter 1, part 177, section 1520, s. Annex B) on cast films of 100 μm thickness produced on a monolayer cast film line with a melt temperature of 220° C. and a chill roll temperature of 20° C. The extraction was performed at a temperature of 50° C. and an extraction time of 30 min.

Relative Total Penetration Energy:

The impact strength of films is determined by the "Dynatest" method according to ISO 7725-2 at 23° C. on cast films with a thickness of 50 μm produced on a monolayer cast film line with a melt temperature of 220° C. and a chill roll temperature of 20° C. The value "Wbreak" [J/mm] represents the relative total penetration energy per mm thickness that a film can absorb before it breaks divided by the film thickness. The higher this value, the tougher the material is.

Tensile modulus in machine and transverse direction were determined according to ISO 527-3 on 50 μm cast films at a crosshead speed of 1 mm/min.

2. Examples

Component (A)

As component (A) the commercial propylene-ethylene random copolymer RD808CF of *Borealis* AG was used. The polymer is based on a conventional 4$^{th}$ generation Ziegler-Natta catalyst with triethylaluminium as cocatalyst and a silane-type external donor, it has an MFR$_2$ of 8.0 g/10 min, an ethylene content of 4.7 wt %, an XCS content of 7.2 wt % and a melting point of 140° C.

Component B

The component B was prepared by polymerization using a metallocene catalyst as described in detail in WO 2015/011135 A1 (metallocene complex MC1 with methylaluminoxane (MAO) and borate resulting in Catalyst 3 described in WO 2015/011135 A1) with the proviso that the surfactant is 2,3,3,3-tetrafluoro-2-(1,1,2,2,3,3,3-heptafluoropropoxy)-1-propanol. The metallocene complex (MC1 in WO 2015/011135 A1) is prepared as described in WO 2013/007650 A1 (metallocene E2 in WO 2013/007650 A1).

Off-Line Prepolymerization Procedure

The catalyst used in the polymerization process was prepared as follows:

The metallocene (MC1) (rac-anti-dimethylsilandiyl(2-methyl-4-phenyl-5-methoxy-6-tert-butyl-indenyl)(2-methyl-4-(4-tert-butylphenyl)indenyl)zirconium dichloride) has been synthesized as described in WO 2013/007650.

The catalyst was prepared using metallocene MC1 and a catalyst system of MAO and trityl tetrakis(pentafluorophenyl)borate according to Catalyst 3 of WO 2015/11135 with the proviso that the surfactant is 2,3,3,3-tetrafluoro-2-(1,1,2,2,3,3,3-heptafluoropropoxy)-1-propanol.

The catalyst MC-1 was pre-polymerized according to the following procedure: Off-line pre-polymerization experiment was done in a 125 mL pressure reactor equipped with gas-feeding lines and an overhead stirrer. Dry and degassed perfluoro-1.3-dimethylcyclohexane (15 cm$^3$) and the desired amount of the catalyst to be pre-polymerized were loaded into the reactor inside a glove box and the reactor was sealed. The reactor was then taken out from the glove box and placed inside a water cooled bath kept at 20° C. The overhead stirrer and the feeding lines were connected and stirring speed set to 450 rpm. The experiment was started by opening the propylene feed into the reactor. The total pressure in the reactor was raised to about 5 barg and held constant by propylene feed via mass flow controller until the target degree of polymerization was reached (10 min). The reaction was stopped by flashing the volatile components. Inside glove box, the reactor was opened and the content poured into a glass vessel. The perfluoro-1,3-dimethylcyclohexane was evaporated until a constant weight was obtained to yield the pre-polymerized catalyst.

Off-Line Prepolymerization Procedure

TABLE 1

Off-line prepolymerization.

| Metallocene | Catalyst amount [mg] | Prepolymerization Degree [wt %/wt %] |
|---|---|---|
| MC-1 | 104 | 3.19 |

Polymerization Examples for Component B (General Procedure)

Two propylene-hexene copolymers B1 and B2 have been prepared with the following base properties:

TABLE 2

Properties of propylene-hexene copolymers (B)

| | MFR$_2$ [g/10 min] | C6 [wt %] | C2 [wt %] | Tm [° C.] |
|---|---|---|---|---|
| B1 | 6 | 5.1 | — | 136 |
| B2 | 6 | 4.9 | 0.35 | 134 |

Component (B1) is a propylene hexene random copolymer. Component (B2) is a bimodal propylene ethylene hexene copolymer with a first fraction of a propylene hexene copolymer and the second fraction being a propylene ethylene hexene terpolymer.

The blending of component (A) with modifying component (B) were done directly on a Collin lab scale cast film line. The film thickness is 50 μm. The properties are listed in Table 3.

TABLE 3

Properties of IEs and CEs.

| | | IE1 | IE2 | IE3 | IE4 | IE5 | CE1 | CE2 |
|---|---|---|---|---|---|---|---|---|
| Component (A) | wt % | 90 | 75 | 60 | 60 | 75 | 100 | 90 |
| Component (B1) | wt % | 10 | 25 | 40 | | | | |
| Component (B2) | wt % | | | | 40 | 25 | | |
| Tafmer XM-7080 | wt % | | | | | | | 10 |
| MFR$_2$ | g/10 min | 14 | 14 | 12 | 14 | 14 | 8 | 13 |
| Dyna/23° C. | J/mm | 18.9 | 20.7 | 23.1 | 25.9 | 28.3 | 40 | 42.1 |
| Haze/b.s. | % | 0.36 | 0.29 | 0.34 | 0.21 | 0.28 | 0.21 | 0.46 |
| Clarity/b.s. | % | 99.7 | 99.7 | 99.5 | 100 | 99.9 | 100 | 99.7 |
| TM/MD | MPa | 411 | 425 | 444 | 436 | 435 | 448 | 374 |
| TM/TD | MPa | 420 | 431 | 448 | 432 | 426 | 462 | 377 |
| SIT | ° C. | 111 | 109 | 111 | 108 | 111 | 114 | 110 |
| C6 FDA* | wt % | 3.2 | 3.06 | 2.45 | 2.62 | 2.83 | 3.13 | 3.44 |
| XCS | wt % | 9.93 | 10.38 | 10.93 | 10.51 | 9.64 | 10 | 18.09 |

Tafmer XM-7080 (Mitsui) is a commercial propylene-based elastomer having MFR (230° C./2.16 kg) of 7.0 g/10 min (ASTM D1238), and melting point of 83° C. (MCI method) marketed as modifier to reduce sealing temperature.
b.s. before sterilization
*measured on a separately prepared 100 μm cast film.

The above experimental data reveal that the addition of propylene hexene copolymer or propylene ethylene hexene terpolymer to conventional propylene ethylene copolymer-type film grade allows achieving reduced seal initiation temperature, while maintaining the mechanical properties and even reducing or also at least maintaining the amount of hexane solubles. The above data further illustrate that the materials according to the present invention have lower seal initiation temperature and lower content of C6 solubles, while the film modulus is largely conserved.

The invention claimed is:

1. Polypropylene composition (PP) comprising a blend of:
   (a) 75.0 to 95.0 wt % of a propylene-ethylene random copolymer (A) having:
      (a1) ethylene content in the range of from 1.5 to 6.0 wt %;
      (a2) MFR$_2$, 230° C., 2.16 kg, ISO1133, in a range of from 1.5 to 20.0 g/10 min;
      (a3) melting temperature Tm, DSC, is in the range of from 135° C. to 155° C.; and
   (b) 5.0 to 25.0 wt % of a component (B) selected from a propylene-hexene random copolymer (B1) having:
      (b1) hexene content in the range of from 3.0 to 5.5 wt %;
      (b3) MFR$_2$, 230° C., 2.16 kg, ISO1133, in a range of from 1.5 to 20.0 g/10 min;
      (b4) melting temperature Tm, DSC, in the range of from 125° C. to 145° C., based on the total weight of the sum of the component (A) and component (B), whereby the MFR$_2$, 230° C., 2.16 kg, ISO1133, of the blend is in a range of from 1.5 to 20.0 g/10 min, and a weight ratio of component (A) and component (B) is from 3:1 to 12:1.

2. Polypropylene composition (PP) according to claim 1, wherein the propylene-ethylene random copolymer (A) has a xylene cold soluble (XCS) amount in the range of 3.5 to 10.0 wt %, as measured according to ISO 16152, first edition, 2005, at 25° C.

3. Polypropylene composition (PP) according to claim 1, wherein the composition has a melting temperature in the range of from 130° C. to 145° C. as measured by differential scanning calorimetry, DSC, according to ISO 11357.

4. Polypropylene composition (PP) according to claim 1, wherein the composition has a hexane extractable fraction as determined according to the FDA method, federal registration, title 21, Chapter 1, part 177, section 1520, Annex B, on cast films of 100 μm thickness produced on a monolayer cast film line with a melt temperature of 220° C. and a chill roll temperature of 20° C., the extraction being performed at a temperature of 50° C. and an extraction time of 30 min, of not higher than 3.20 wt %.

5. Polypropylene composition (PP) according to claim 1, wherein the weight ratio of component (A) and component (B) is from 3:1 to 10:1.

6. Polypropylene composition (PP) according to claim 1, wherein the composition has a xylene cold soluble (XCS) amount in the range of from 8.0 to 15.0 wt %, measured according to ISO 16152, first edition, 2005, at 25° C.

7. Process for the preparation of the polypropylene composition according to claim 1, the process comprising:
 (i) preparing the propylene-ethylene random copolymer (A) by polymerizing propylene and ethylene in the presence of a Ziegler-Natta catalyst;
 (ii) preparing the propylene-hexene random copolymer (B1), the propylene-hexene-ethylene terpolymer (B2) or a mixture thereof by polymerizing propylene and hexene and optionally ethylene in the presence of a single site catalyst;
 (iii) mixing said propylene-ethylene random copolymer (A) with the propylene-hexene random copolymer (B1), the propylene-hexene-ethylene terpolymer (B2) or a mixture thereof to obtain a mixture of (A) and (B); and
 (iv) extruding said mixture to obtain the blend of (A) and (B).

8. An article comprising the polypropylene composition according to claim 1, wherein the article comprises an unoriented film, the film having (i) a sealing initiation temperature (SIT, as calculated from DSC) of less than 114° C. and (ii) a relative total penetration energy (Wbreak) as determined by the "Dynatest" method according to ISO 7725-2 at 0° C. on a cast film with a thickness of 50 μm of more than 15.0 J/mm.

9. The article according to claim 8, wherein the film has a sealing initiation temperature (SIT, as calculated from DSC) in the range from 105° C. to 113° C.

10. The article according to claim 8, wherein the film has a relative total penetration energy (Wbreak) as determined by the "Dynatest" method according to ISO 7725-2 at 0° C. on a cast film with a thickness of 50 μm in the range of 16.0 to 40.0 J/mm.

11. The article according to claim 8, wherein the film has a haze determined on 50 μm cast film of below 1.0% and a clarity determined on 50 μm cast film of above 97.0%.

12. The article according to claim 8, wherein the article comprises an unoriented film comprising more than 90 wt % of the polypropylene composition (PP) according to claim 1, based on the total weight of the article, wherein the film is a cast film or a blown film.

* * * * *